United States Patent [19]

Nakagawa

[11] Patent Number: 5,548,117

[45] Date of Patent: Aug. 20, 1996

[54] PROBE FOR A SCANNING TUNNELING MICROSCOPE AND METHOD OF MANUFACTURING A PROBE

[75] Inventor: Tohru Nakagawa, Kusatsu, Japan

[73] Assignee: Matsushita Electric Industrial Co., Ltd., Osaka, Japan

[21] Appl. No.: 308,914

[22] Filed: Sep. 20, 1994

Related U.S. Application Data

[62] Division of Ser. No. 1,753, Jan. 7, 1993, Pat. No. 5,348,638.

[30] Foreign Application Priority Data

Jan. 16, 1992 [JP] Japan .................................... 4-005609

[51] Int. Cl.⁶ ................................................. H01J 37/26
[52] U.S. Cl. ........................................ 250/423 F; 250/306
[58] Field of Search .................................. 250/306, 307, 250/423 F

[56] References Cited

U.S. PATENT DOCUMENTS

| | | | |
|---|---|---|---|
| 4,896,044 | 1/1990 | Li | 250/492.2 |
| 5,348,638 | 9/1994 | Nakagawa | 205/122 |
| 5,353,632 | 10/1994 | Nakagawa | 73/105 |
| 5,357,109 | 10/1994 | Kusumoto | 250/306 |

*Primary Examiner*—Bruce C. Anderson
*Attorney, Agent, or Firm*—Fish & Richardson P.C.

[57] ABSTRACT

Disclosed is a probe for use in a scanning tunneling microscope which can measure a macromolecule, i.e., a protein molecule. The probe is manufactured by covering a metal wire having a sharp end with a thin organic film, removing an end of the metal wire by an electric field evaporation process, electrodepositing metal ions on the metal wire and removing a portion of the organic film. A monomolecular film is formed on the surface of a metal wire by chemically adsorbing a chlorosilane based chemical adsorbent. Only a tip of the chemically adsorbed film is removed by the electric field evaporation procedure, and the metal ions are electrodeposited on the tip of the metal wire. As a result, a sharp metal tip is formed. After that, the chemically adsorbed film is removed by alkyl treatment.

3 Claims, 3 Drawing Sheets

PROBE FOR A SCANNING TUNNELING MICROSCOPE AND METHOD OF MANUFACTURING A PROBE

This application is a division of U.S. application Ser. No. 08/001,753 filed Jan. 7, 1993, now U.S. Pat. No. 5,348,638.

FIELD OF THE INVENTION

The present invention relates to a method of manufacturing a probe for use in a scanning tunneling microscope. More particularly, it relates to a method of manufacturing a sharp probe having a tip for use in a scanning tunneling microscope, which can measure a macromolecule, i.e., a protein molecule, and a method of manufacturing the probe.

BACKGROUND OF THE INVENTION

In general, a probe for use in a scanning tunneling microscope is manufactured by an electrolytic polishing method using tungsten. As shown in FIG. 4, tungsten wire 10 and platinum wire 11 were dipped and held in a sodium nitrite solution (20 g/100 ml $H_2O$), and 30 V from a voltage generator 12 was applied between the tungsten wire and platinum wire with the tungsten wire supplying a positive potential. About 1 mm of the tungsten wire was inserted vertically in the above-mentioned solution. The voltage continued to be applied until bubbles did not rise from the tungsten wire and flashing stopped. After taking out the tungsten wire from the sodium nitrite solution, the tungsten wire was washed with pure water for five minutes, then with ethanol for five minutes. As a result, the sharp probe having a tip was manufactured.

According to a probe for use in a scanning tunneling microscope which was manufactured by a conventional method, it was effective to examine an image of atom on a plain surface of a substrate having at most 1 nm of roughness, such as graphite and silicon. However, there is a problem in examining a macromolecule, i.e., a molecule of protein, which is formed on a surface of a solid state.

Consequently, the details of the problem abovementioned are explained using figures as follows.

In FIG. 5, 20 designates a probe, 21 designates a sample substrate, 22 designates a substrate, 23 designates a tunneling current. As shown in FIG. 5, when a probe 20 is sharpened ideally, a tunneling current occurs only through a tip of a probe. However, in general, a probe is not sharpened like a probe 20. As shown in FIG. 6, a tunneling current 23 occurs through a side part of a probe 24. A scanning tunneling microscope is manufactured for analyzing the shape of a sample substrate providing that the tunneling current 23 occurs between the tip of a probe 24 and the sample substrate 21. As shown in FIG. 6, an accurate image of molecules could not be obtained.

This invention aims to provide a probe for use in a scanning tunneling microscope. The probe has a sharp tip which can measure a macromolecule, i.e., a protein molecule. The invention also provides a method of manufacturing the probe for use in a scanning tunneling microscope.

SUMMARY OF THE INVENTION

In order to accomplish the above object, this invention includes a probe for use in a scanning tunneling microscope, comprising metalic probe body and a sharp metal tip, wherein the metallic probe body and sharp metal tip are connected together in an area of less than about 100 $nm^2$.

It is preferable in this invention that the chemically adsorbed film is formed on an outer surface of the metallic probe body via a covalent siloxane bonds (—SiO—).

It is preferable in this invention that the chemically adsorbed film is a monomolecular film, a laminated film, or a polymer film.

The probe is manufactured by placing active hydrogen groups on a surface of a metal wire, forming a chemically adsorbed film on a surface of the metal wire using a silane-based chemical adsorbent to initiate a condensation reaction, removing less than about 100 $nm^2$ of the chemically adsorbed film from one end of the metal wire, and forming a sharp metal tip on the end of the metal wire by electrodeposition or vacuum deposition.

It is preferable in invention that the chemically adsorbed film is removed by electric field evaporation or by pressing against a surface of a solid.

It is preferable in this invention that the chemically adsorbed film is a monomolecular film, a laminated film, or a polymer film.

It is preferable in this invention the silane-based chemical adsorbent is a compound having an alkyl or a fluoroalkyl group and a chlorosilane group at a molecular end.

It is preferable in this invention the chemically adsorbed film is removed after forming the sharp metal tip.

It is preferable in this invention that the condensation reaction is a dehydrochlorination reaction.

According to this invention, a protrusion having a diameter of several nanometers is formed on a sharp end of a metal wire by electrodeposition or vacuum deposition, and a probe for use in a scanning tunneling microscope to examine a macromolecules, i.e., protein molecules is obtained.

According to a preferred structure of this invention, a chemically adsorbed film is formed on a outer surface of a probe body via covalent siloxane bonds (—SiO—). Adsorption of moisture in the air to an outer surface of the probe body can be prevented by the chemically adsorbed film abovementioned. When the probe approaches a surface of a sample substrate which is to be measured, and contacts with water on a surface of the sample substrate. The probe is not attracted to the sample substrate by the surface tension of the water on the surface of the sample substrate.

The probe abovementioned can be manufactured efficiently and rationally. A sharp metal tip having a diameter of several nanometers can be formed by electrodeposition or vacuum deposition of a mask material which is a thin film having a thickness at the nanometer level. The film is formed by using a silane-based chemical adsorbent.

The chemically adsorbed molecular film formed on the surface of the substrate having the narrow area can be removed by electric field evaporation or pressing against the surface of a solid. As a result, a mask material is obtained.

An organic film can be firmly and covalently bonded to atoms of the surface of the metal wire by forming a chemically adsorbed film which covers the metal by using a silane coupling agent. Using an electric field evaporation process or an electrodeposition for manufacturings the probe, the film can not be separated and a probe can be manufactured having good reproduction.

In the invention, the chemically adsorbed film may be removed after formation of the sharp metal tip. As a result, a probe consisting only of metal can be obtained.

DETAILED DESCRIPTION OF THE INVENTION

A method of manufacturing a porbe for use in a scanning tunneling microscope of the invention will be explained using figures.

Figure 1:
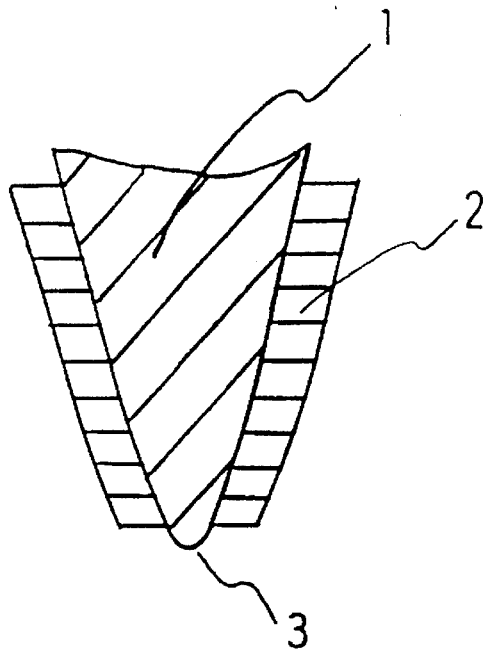
FIG. 1 shows a probe for use in a scanning tunneling microscope on whose surface a chemically adsorbed film is formed and a tip of the chemically adsorbed film is removed.
Figure 2:
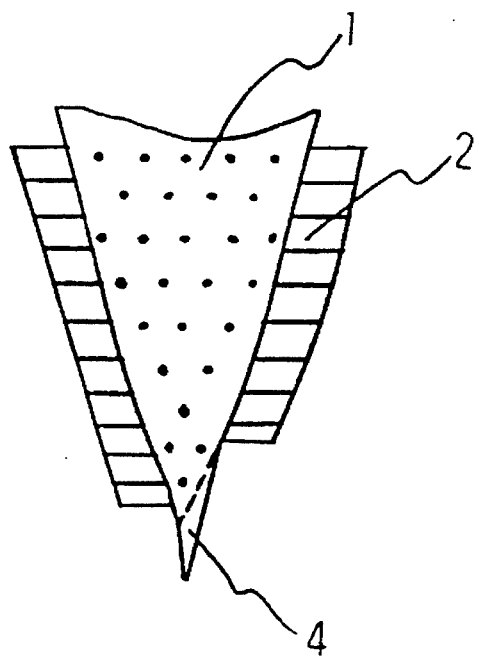
FIG. 2 shows a probe for use in a scanning tunneling microscope comprising a sharp metal tip.

As shown in FIG. 1, a metal wire having a sharp tip 1 is covered with an organic monomolecular film 2. By initiating an electric field evaporation operation at one end of the metalic wire, a hole 3 having a diameter of several nanometers can be obtained at one end of the metal wire. By initiating an electrodeposition operation at one end of the metal wire, metal ions are absorbed only onto hole 3. The metal ions are electrodepositioned at the hole 3, and a sharp metal tip 4 can be formed (FIG. 2). A probe having a sharp metal tip 4 as a protrusion 4, as shown in FIG. 2, can be manufactured by removing the monomolecular film 2. It is possible to examine a macromolecule such as a protein molecule by using the abovementioned probe. According to the invention, it is possible to examine a macromolecule such as a protein molecule by a probe having a protrusion using an organic monomolecular film made of a silane coupling agent.

According to the invention, it is desirable to separate the monomolecular film which covers the metal wire by covering a metal wire having a sharp tip with an organic monomolecular film and applying a negative electric charge to the metal wire to initiate an electric field evaporation treatment to the end of the metal wire and initiating an electrodeposition operation at the end of the metal wire.

According to an electric field evaporation method which is used in the invention, atoms within a material are vaporized from the surface of the material by applying a high electric field the surface of the material. By approaching a metal wire having a sharp end to a surface of a plain conductor and applying an electric potential, an electric field is concentrated on the end of the metal wire, and only atoms at this portion are vaporized. Therefore, after forming a chemically adsorbed film having an alkyl group or a fluoroalkyl group on the surface of the metal wire via siloxane bonds, only the chemically adsorbed film on the end of the metal wire is removed by the electric field evaporation process.

Further, a chemically adsorbed film formed on an end of a metal wire can be removed by pressing one end of the material against the surface of a solid.

Further, in addition to an electrodeposition method, a vacuum deposition process can be used to form a sharp metal end in which the chemically adsorbed film is removed.

Further, the chemically adsorbed film may be a monomolecular film or a laminated film or a polymer film.

Examples of silane-based surface active agents containing an alkyl group of the present invention include trichlorosilane-based chemical adsorbents i.e., $CH_3(CH_2)_nSiCl_3$, dichlorosilane-based chemical adsorbents i.e., $CH_3(CH_2)_nCH_3SiCl_2CH_3$, $CH_3(CH_2)_nSiCl_2C_2H_5$, and monochlorosilane-based chemical adsorbents i.e., $CH_3(CH_2)_nSiCl(CH_3)_2$, $CH_3(CH_2)_nSiCl(C_2H_5)_2$, where n represents an integer from 0 to 25, most suitably 10 to 20.

Among these examples, trichlorosilane-based chemical adsorbents are formed on a surface of a probe and between adjacent molecules, thereby permitting formation of a more firmly chemically adsorbed film.

Examples of silane-based surface active agents containing a fluoroalkyl group of the present invention include trichlorosilane-based chemical adsorbents i.e., $CF_3(CF_2)_7(CH_2)_2SiCl_3$,
$CF_3CH_2O(CH_2)_{15}SiCl_3$,
$CF_3(CH_2)_2Si(CH_3)_2(CH_2)_{15}SiCl_3$,
$CF_3(CF_2)_3(CH_2)_2Si(CH_3)_2(CH_2)_9SiCl_3$,
$CF_3(CF_2)_7(CH_2)_2Si(CH_3)_2(CH_2)_9SiCl_3$,
$CF_3COO(CH_2)_{15}SiCl_3$,
$CF_3(CF_2)_5(CH_2)_2SiCl_3$.

Examples of lower-alkyl substituted monochlorosilane- or dichlorosilane-based chemical adsorbents of the present invention include $CF_3(CF_2)_7(CH_2)_2SiCl_n(CH_3)_{3-n}$,
$CF_3(CF_2)_7(CH_2)_2SiCl_n(C_2H_5)_{3-n}$,
$CF_3CH_2O(CH_2)_{15}SiCl_n(CH_3)_{3-n}$,
$CF_3CH_2O(CH_2)_{15}SiCl_n(C_2H_5)_{3-n}$,
$CF_3(CH_2)_2Si(CH_3)_2(CH_2)_{15}SiCl_n(CH_3)_{3-n}$,
$CF_3(CF_2)_3(CH_2)_2Si(CH_3)_2(CH_2)_9SiCl_n(C_2H_5)_{3-n}$,
$CF_3(CF_2)_7(CH_2)_2Si(CH_3)_2(CH_2)_9SiCl_n(CH_3)_{3-n}$,
$CF_3COO(CH_2)_{15}SiCl_n(CH_3)_{3-n}$,
$CF_3(CF_2)_5(CH_2)_2SiCl_n(CH_3)_{3-n}$, where n represents 1 or 2.

Among these examples, trichlorosilane-based chemical adsorbents are preferred because siloxane bonds are formed on the surface of the probe and between adjacent molecules, thereby permitting formation of a more firmly chemically adsorbed film.

Further, with a vinyl or acetylene group (ethynyl group) added to or incorporated in the alkyl group or the alkyl fluoride chain portion, the chemically adsorbed film may be crosslinked after formation by irradiating it with an electron beam of about 5 Mrads, further improving the hardness of the chemically adsorbed film.

The chlorosilane-based surface active material capable of use according to the invention is not limited to those in the form of a straight chain as noted above. It is possible to use a branched alkyl fluoride or hydrocarbon group or those having a substituted alkyl fluoride or hydrocarbon group with silicon at one end (i.e., those represented by the formula $R_2SiCl_3$, $R_3SiCl$, $R^1R^2SiCl_2$ or $R^1R^2R^3SiCl$ where R, $R^1$, $R^2$ and $R^3$ represents an fluorocarbon group or a hydrocarbon group). To increase the adsorption density, however, the straight chain form is preferred.

Further, by chemically adsorbing a material as an inner layer material having a plurality of chlorosilyl bonds, e.g., $SiCl_4$, $SiHCl_3$, $SiH_2Cl_2$, $Cl(SiCl_2O)_nSiCl_3$, (where n represents an integer), $SiCl_m(CH_3)_{4-m}$, $SiCl_m(C_2H_5)_{4-m}$ (where m represents 1, 2 or 3), and $HSiCl_r(CH_3)_{3-r}$, $HSiCl_r(C_2H_5)_{3-r}$ (where r represents 1 or 2), and then reacting it with water, surface chlorosilyl bonds are converted to hydrophilic silanol bonds, thus activating hydrogen on the surface of an inner layer film. Among the materials containing a plurality of chlorosilyl groups, tetrachlorosilane ($SiCl_4$) is preferred in that it is highly reactive and low in molecular weight. It can, therefore, provide silanol bonds at a high density. Chlorosilane-based surface active agents containing an alkyl group or a fluoroalkyl group can be chemically adsorbed to the surface of the inner layer film. The chemically adsorbed film has an increased density and is excellent in insulation and durability.

In order to form a chemically adsorbed film containing an alkyl group or a fluoroalkyl group via a siloxane bond on a surface of a metal wire having a sharp end according to the invention, the non-aqueous solvent to be used according to the invention may be any organic solvent, which is free from active hydrogen able to react with the chlorosilane-based surface active material. Suitable examples of the solvent are fluorine-based solvents, e.g., 1,1-dichloro, 1-fluoroethane, 1,1-dichloro-2,2,2-trifluoroethane, 1,1- dichloro-2,2,3,3,3-pentafluoropropane, 1,3-dichloro-1,1,2,2,3-pentafluoropropane, trifluoroalkylamine, perfluorofran, and fluoroalkyl derivative etc., hydrocarbon-based solvents, e.g., hexane, octane, hexadecane, cyclohexane, etc., ether-based solvents, e.g., dibutylether, dibenzylether, etc., and ester-based solvents, e.g., methyl acetate, ethyl acetate, isopropyl acetate, amyl acetate, etc.

A single layer of a monomolecular chemically adsorbed film formed on the surface of a metal wire having a sharp end according to the invention can be obtained and function sufficiently. A single layer of a monomolecular chemically adsorbed film can be formed easily by dipping a metal wire in a non-aqueous solvent containing a chlorosilane-based surface active agent to chemically adsorb the film. The metal wire is then washed with a non-aqueous solvent without contacting with water. Thus, special treatment is not needed.

Further, the chemically adsorbed film may be laminated. A laminated film is formed by contacting a metal wire with a non-aqueous solvent containing a chemical adsorbent having a halosilyl group at both ends, i.e., $CCl_3Si(CH_2)_2(CF_2)_6(CH_2)_2SiCl_3$ and washing with a non-aqueous solvent, then with water, repeatedly. By repeating the abovementioned step, a laminated film can be formed.

A chemically adsorbed polymer film can be formed by washing a chlorosilane-based chemically adsorbed film which is adsorbed on the surface of a metal wire with a solvent containing water, i.e., ethanol.

The description of examples in this invention are as follows.

EXAMPLE 1

A tungsten wire with a diameter of 0.2 mm and a lenghth of 10 mm was sharpened by an electrolytic polishing method. The electrolytic polishing is carried out as follows.

A tungsten wire and platinum wire were dipped and held in a sodium nitrite solution (20 g/100 ml $H_2O$), and 30 V from a voltage generator was applied between the tungsten wire and platinum wire with the tungsten wire as positive potential. About 1 mm of one end of the tungsten wire was inserted vertically in the above-mentioned solution. The voltage continued to be applied until bubbles did not rise from the tungsten wire and flashing stopped. After taking out the tungsten wire from the sodium nitrite solution, the tungsten wire was washed with pure water for five minutes, then with ethanol for five minutes.

The tungsten wire was dipped and held in a solution for one hour, in which 30 mM of octadecyl-trichlorosilane, as a silane coupling agent (hereafter OTS is an abbreviation for this) was dissolved in an organic solvent. The organic solvent was made of 80 vol. % normal-hexadecane, 12 vol. % carbon tetrachloride and 8 vol. % chloroform). After that, the tungsten wire was washed with chloroform and with pure water. After the treatment abovementioned, the tungsten wire became water-repellent, and was covered with a monomolecular film of OTS.

The reaction of a hydroxyl group (—OH) on a surface of a tungsten wire and OTS was carried out as formula 1.

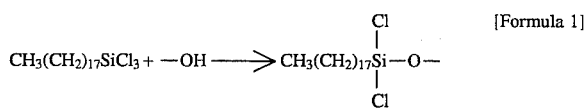

[Formula 1]

Next, the tungsten wire was washed with chloroform to remove unreacted OTS on the surface of the tungsten wire. Then, the tungsten wire was washed with pure water to hydrolyze the chloro groups in the formula (formula 1), and silanol groups (—SiOH) were obtained. The reaction was carried out as formula 2.

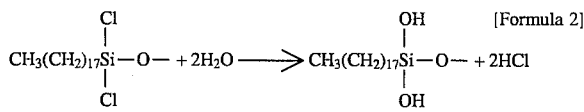

[Formula 2]

Next, a dehydration condensation reaction was brought about between adjacent silanol groups. As a result, silanol groups were crosslinked to form siloxane bonds (—SiO—). The reaction was carried out as formula 3.

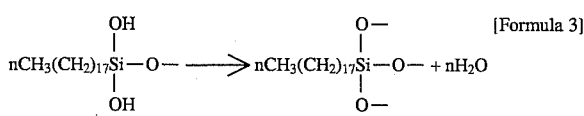

[Formula 3]

(n represents a integer, more than 1)

According to the reaction abovementioned, a monomolecular film was formed. In the abovementioned reaction, a chemically adsorbed polymer film can be formed without washing with chloroform.

Next, a tip of the tungsten wire was placed several millimeters from a plain platinum plate electrode, and 2000 V was applied between the tungsten wire and the platinum plate electrode. The tungsten wire acted as the negative potential for 50–60 mseconds. As a result, tungsten atoms on the tip of the wire were vaporized. At the same time, OTS on the tip of the tungsten wire was removed. By examining the shape of the tip of the tungsten wire using a scanning electron microscope, it was found that an area of about 100 $nm^2$ had changed. According to the result, it was found that 100 $nm^2$ of the OTS film was removed by the operation abovementioned. FIG. 1 is a view showing a cross section of the probe. In FIG. 1, 1 indicates a tungsten wire, 2 indicatesa a monomolecular adsorbed film, 3 indicates the tip of the tungsten wire which was vaporized by the electric field.

Next, platinum was electrodeposited on the tungsten wire. The electrodeposition method will be described as follows.

The tungsten wire above mentioned was dipped in 50 ml of a solution containing chloroplatinic acid (30 mg/ml) and acetic acid lead (0.6 mg/ml) with the tungsten wire acting as a working electrode. A square of platinum plate having 10 mm in length at one side was used as a counter electrode. The portion of the probe whose OTS was removed was filled with platinum atoms by applying an electric potential of 0.2 V to the tungsten wire with silver and silver chloride electrodes as reference electrodes for about one second. FIG. 2 is a cross section of a probe after the treatment abovementioned. In FIG. 2, 4 indicates a sharp metal tip of platinum atoms.

Figure 3:
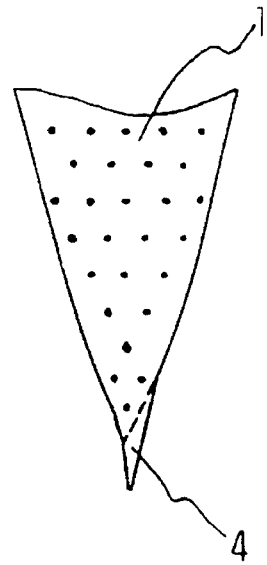
FIG. 3 shows a probe for use in a scanning tunneling microscope in which the monomolecular adsorbed film has been removed.
Figure 4:
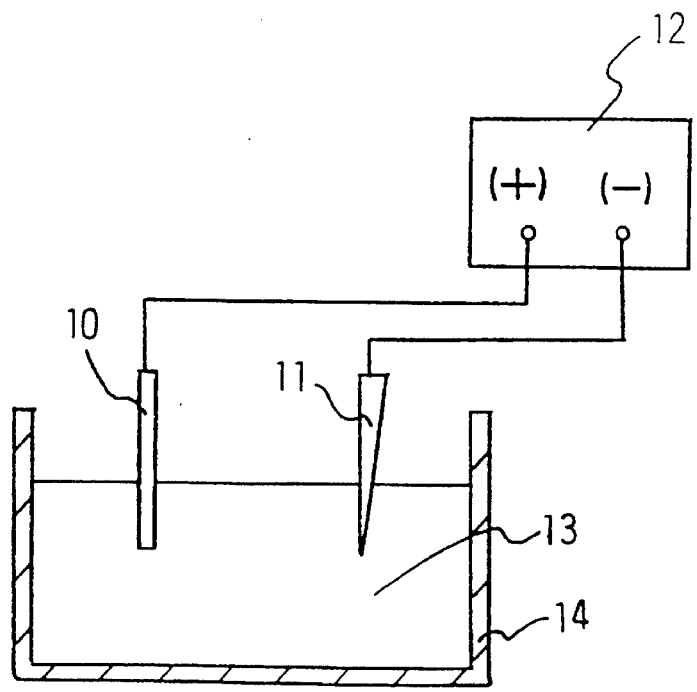
FIG. 4 shows a method of manufactured a tip of a scanning tunneling microscope by a conventional process.
Figure 5:
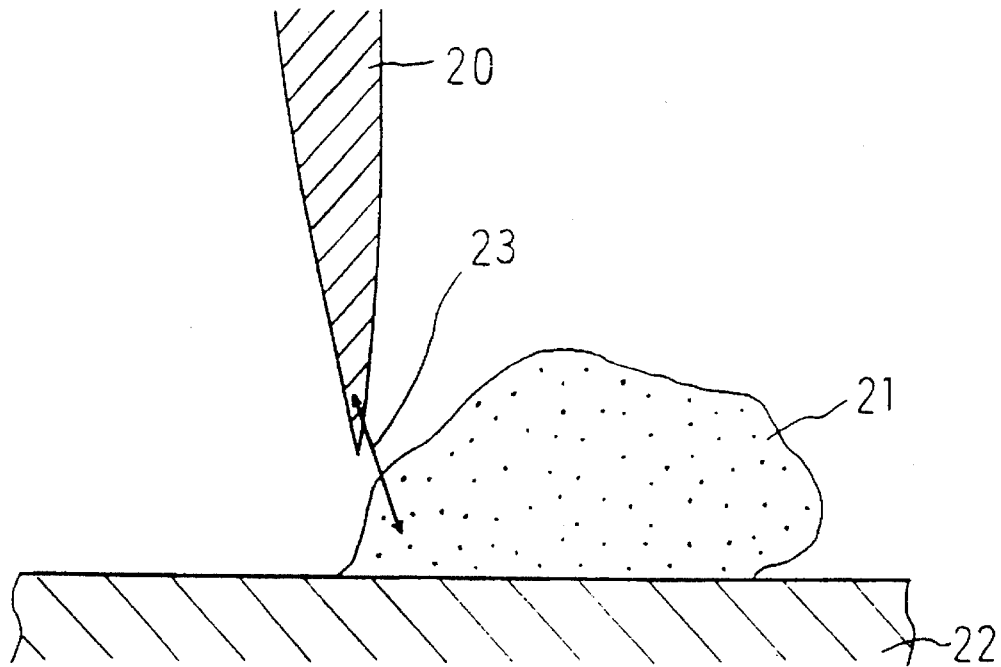
FIG. 5 shows a tunneling current which occurs between the probe and a macromolecule which is fixed on the surface of a substrate.
Figure 6:
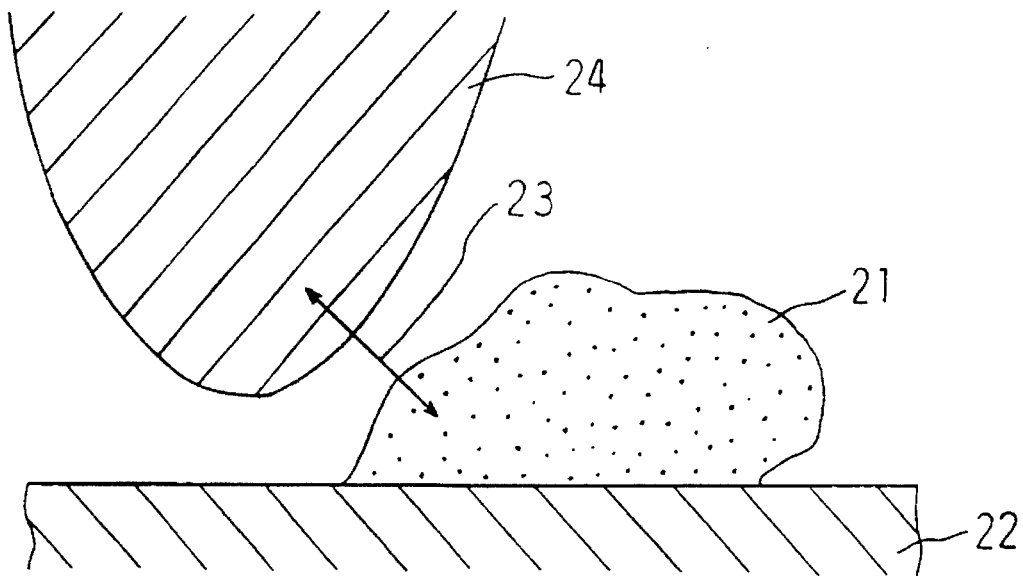
FIG. 6 shows a tunneling current which occurs between the probe which does not have a sharp tip which has been manufactured by a conventional method and a macromolecule which is fixed on the surface of a substrate.

Then, the OTS film formed on the probe was removed by dipping the tungsten wire in a sodium hydroxide (1 mole) water solution for about thirty minutes. As a result, a probe for use in a scanning tunneling microscope was obtained. FIG. 3 is a schematic sectional view showing the probe abovementioned.

Next, deoxyribonucleic acid (1500 base pairs) from colon bacteria was measured by utilizing a probe, which was manufactured according to the invention, in a conventional scanning tunneling microscope (e.g., NANOSCOPE manufactured by DIGITAL INSTRUMENT CORPORATION). Deoxyribonucleic acid was fixed on a square of a graphite substrate having 10 mm in length on one side by dropping a coliform deoxyribonucleic acid solution (10–50 µg/ml), and drying in a nitrogen atomosphere. The probe was scaned at an atomic level on a surface of a sample substrate, while adjusting the distance between the probe and the sample substrate so as to keep tunneling current constant. As a result, an accurate image of the DNA was observed.

EXAMPLE 2

A probe for use in a scanning tunneling microscope was manufactured as in Example 1. However, a step of removing the OTS film by dipping in a sodium hydroxide solution was omitted. An accurate image of DNA was the probe as in Example 1.

EXAMPLE 3

A probe for use in a scanning tunneling microscope was manufactured as in Example 1 except for using platinumiridium alloy wire instead of a tungsten wire. In addition, a probe for use in a scanning tunneling microscope was manufactured as in Example 1. An accurate image of DNA was observed using these probes.

EXAMPLE 4

A probe for use in a scanning tunneling microscope was manufactured as in Example 3. However, a chemical adsorbed monomolecular film was not removed. An accurate image of DNA was the probe as in Example 1.

EXAMPLE 5

A probe for use in a scanning tunneling microscope was manufactured as in Example 1. However, a chemically adsorbed monomolecular film of OTS on the top of the metal wire was removed by pressing the wire against a silocon plate. About 0.1 to 1 mN of loading was applied to the metal wire. By examining the shape of the end of the tungsten wire, it was found that there was an area of about 100 nm$^2$ which was changed. According to the result, it was found that about 100 nm$^2$ of the OTS film was removed. An accurate image of DNA was observed using these probes as in Example 1.

EXAMPLE 6

A probe for use in a scanning tunneling microscope was manufactured as in Example 5. However, a chemical adsorbed monomolecular film was not removed. An accurate image of DNA was the probe as in Example 1.

EXAMPLE 7

A probe for use in a scanning tunneling microscope was manufactured as in Example 5. However, a platinumiridium alloy wire was used as a metal wire instead of tungsten wire. An accurate image of DNA was observed using these probes as in Example 1.

EXAMPLE 8

A probe for use in a scanning tunneling microscope was manufactured as in Example 7. However, a chemical adsorbed monomolecular film was not removed. An accurate image of DNA was the probe as in Example 1.

EXAMPLE 9

A probe for use in a scanning tunneling microscope was manufactured as in Example 1. However, platinumiridium was placed on a tip of a metal wire by an electronic beam method (EB method) instead of electro deposition, using vacuum deposition. The electronic beam deposition method was carried out setting a base pressure of $5\times10^{-6}$ Torr and a deposition speed of 1 nm/sec. for two seconds. An accurate image of DNA was observed using these probes as in Example 1.

EXAMPLE 10

A probe for use in a scanning tunneling microscope was manufactured as in Example 3. However, platinumiridium was placed on the tip of the metal wire by vacuum deposition instead of electrodeposition. An electronic beam deposition method (EB method) as the vacuum depositon beam method was carried out setting a base pressure of $5\times10^{-6}$ Torr and a deposition speed of 1 nm/sec. for two seconds. An accurate image of DNA was observed using these probes in the same way as Example 1.

EXAMPLE 11

A probe for use in a scanning tunneling microscope was manufactured as in Example 5. However, platinumiridium was placed on the tip of the metal wire by vacuum deposition instead of electrodeposition. An electronic beam deposition method (EB method) as the vacuum depositon beam method was carried out setting a base pressure of $5\times10^{-6}$ Torr and a deposition speed of 1 nm/sec. for two seconds. An accurate image of DNA was observed using these probes as in example 1.

EXAMPLE 12

A probe for use in a scanning tunneling microscope was manufactured as in Example 7. However, platinumiridium was placed on the tip of the metal wire by vacuum deposition instead of electrodeposition. An electronic beam deposition method (EB method) as the vacuum depositon beam method was carried out setting a base pressure of $5\times10^{-6}$ Torr and a deposition speed of 1 nm/sec. for two seconds. An accurate image of DNA was observed repeatedly using these probes as in Example 1.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A probe for use in a scanning tunneling microscope, comprising a metallic probe body and a sharp metal tip, wherein the metallic probe body and sharp metal tip are connected together in an area of less than about 100 nm$^2$.

2. The probe for use in a scanning tunneling microscope according to claim 1, wherein a chemically adsorbed film is formed on an outer surface of the metallic probe body via covalent siloxane bonds (—SiO—).

3. The probe for use in a scanning tunneling microscope according to claim 1, wherein said chemically adsorbed film is a monomolecular film or a laminated film or a polymer film.

* * * * *